(12) United States Patent
Liang

(10) Patent No.: US 7,355,115 B2
(45) Date of Patent: Apr. 8, 2008

(54) COMPUTER CASING BAFFLE PLATE DEVICE

(75) Inventor: Chien-Fa Liang, Chung-Ho (TW)

(73) Assignee: Super Micro Computer, Inc., San Jose, CA (US)

( * ) Notice: Subject to any disclaimer, the term of this patent is extended or adjusted under 35 U.S.C. 154(b) by 355 days.

(21) Appl. No.: 11/239,038

(22) Filed: Sep. 30, 2005

(65) Prior Publication Data

US 2007/0076359 A1    Apr. 5, 2007

(51) Int. Cl.
 *H02G 3/08* (2006.01)
(52) U.S. Cl. .................. 174/50; 361/683; 361/724; 361/730
(58) Field of Classification Search .............. 174/50, 174/53, 521, 58, 57, 135; 220/3.2, 3.3, 4.02; 361/600, 601, 685, 724, 726, 727, 730, 683, 361/687, 752, 695
See application file for complete search history.

(56) References Cited

U.S. PATENT DOCUMENTS

| | | | | |
|---|---|---|---|---|
| 4,751,872 A | * | 6/1988 | Lawson, Jr. .............. | 361/685 |
| 6,058,011 A | * | 5/2000 | Hardt et al. ............. | 361/687 |
| 6,700,778 B1 | * | 3/2004 | Wang ...................... | 361/695 |
| 7,054,164 B2 | * | 5/2006 | Shih-Tsung ............. | 361/752 |
| 7,142,431 B2 | * | 11/2006 | Li et al. .................. | 361/726 |
| 7,254,017 B2 | * | 8/2007 | Peng et al. .............. | 361/685 |

* cited by examiner

*Primary Examiner*—Angel R. Estrada
(74) *Attorney, Agent, or Firm*—Troxell Law Office, PLLC

(57) ABSTRACT

A computer casing baffle plate device is composed of a computer casing which contains a left and right side walls provided with protruded members, shaft holes, and screw holes, with transversal concave parts formed below front ends of upper surfaces. A baffle plate whose bottom is provided with shaft holes and whose upper plate surface is provided with spring leaves having protruded slopes and protruded plates which are extended outward. A shaft is flexibly connected to the shaft holes on the casing and the shaft holes on the baffle plate. Spring leaves are deformed and pressed against the transversal concave parts, so as to vertically fix the baffle plate inside the casing. The baffle plate can be rotated by an angle inside the casing by a simple disassembling, thereby facilitating an assembling and disassembling of other components inside the casing.

3 Claims, 5 Drawing Sheets

COMPUTER CASING BAFFLE PLATE DEVICE

BACKGROUND OF THE INVENTION (a) Field of the Invention

The present invention relates to a computer casing baffle plate device, and more particularly to a baffle plate which can be easily rotated by an offset angle, to facilitate repairing or assembling/exchanging electronic components inside the computer casing.

(b) Description of the Prior Art

A vertical baffle plate is usually screwed inside a conventional computer casing. However, this baffle plate is screwed on the casing with at least four bolts; therefore, the bolts should be completely removed from the casing and the baffle plate should be taken out in order to assemble/disassemble components at two sides of the baffle plate, which is very troublesome during implementation.

SUMMARY OF THE INVENTION

The primary object of the present invention is to provide a computer casing baffle plate which can be rotated inside the casing by an angle through a simple disassembling, thereby facilitating an assembling and disassembling of other components inside the casing.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
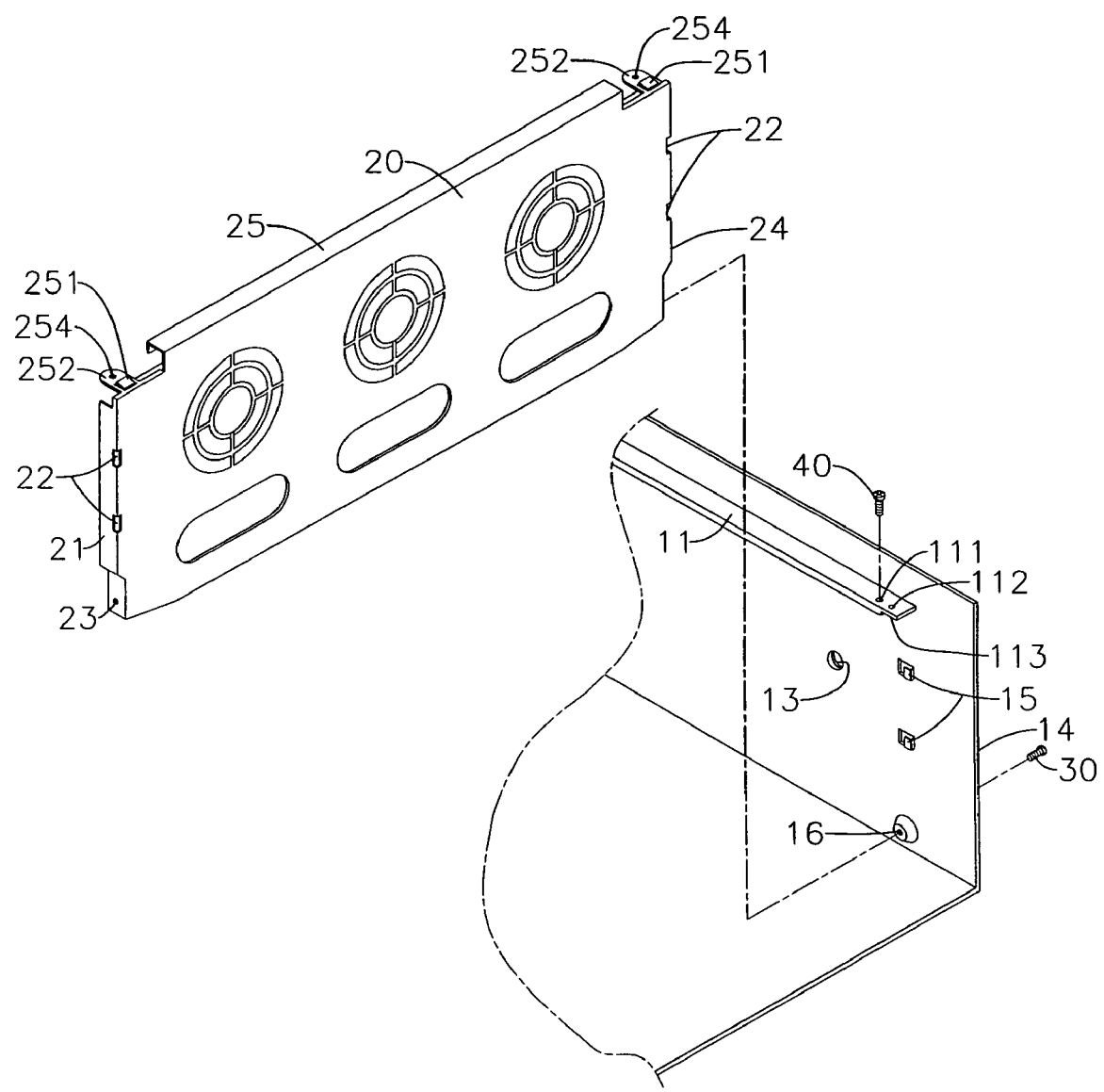
FIG. 1 shows a perspective view of compartments of the present invention.
Figure 2:
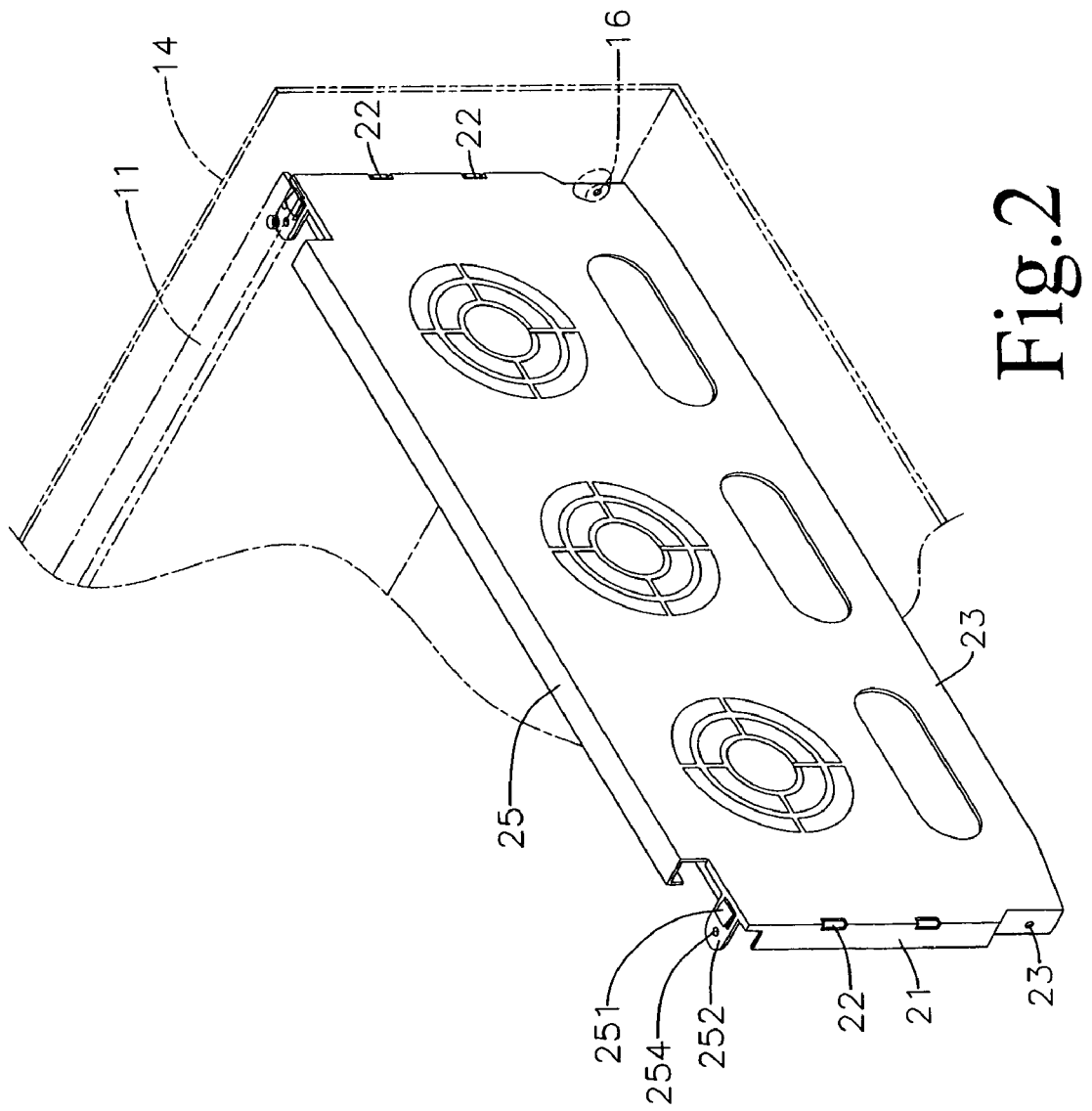
FIG. 2 shows a perspective view of assembling compartments of the present invention.
Figure 3:
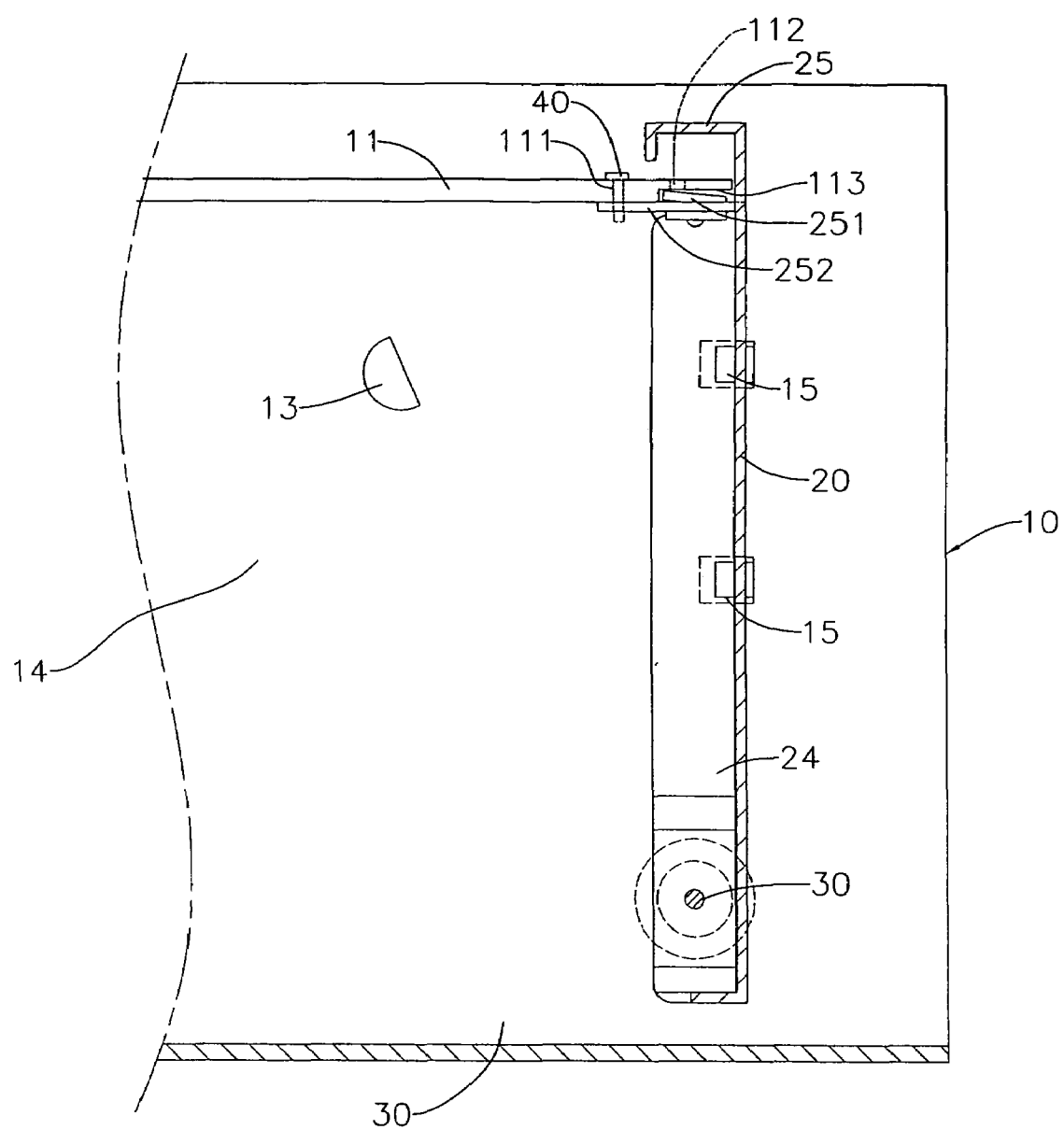
FIG. 3 shows a sectional view of the present invention.

Referring to FIG. 1 and FIG. 3, the present invention includes a computer casing 10, which contains two opposite side walls 14 on which provided with protruded members 13. Shaft holes 16 are located below the left and right side walls 14, and screw holes 111 (or through holes) are located at sides of upper surfaces 11 in a transversal direction of the left and right side walls, respectively. Small through holes 112 are located in front of the screw holes 111, and transversal concave parts 113 are formed below front ends of the upper surfaces 11.

Shaft holes 23 are located below left and right wall edges 21, 24 of a baffle plate 20, respectively. Spring leaves 251 having protruded slopes and protruded plates 252 extended outward in a transversal direction are fixed at two sides of an upper plate surface 25, respectively. The protruded plates 252 are provided with screw holes 254. A shaft 30 is flexibly connected to the shaft holes 16 on the casing 10 and the shaft holes 23 on the baffle plate 20, and bolts 40 can be screwed into the screw holes 111 and the screw holes 254 of the protruded plates 252. The spring leaves 251 are pressed, deformed, and against on the walls of the transversal concave parts 113, and the baffle plate 20 is vertically fixed inside the casing 10.

As shown in FIG. 1 and FIG. 3, clipping pieces 15 which are protruded and have elasticity are protruded on the left and right walls 14 in front of the protruded members 13, forming latching slots 151 in interior sides of the clipping pieces 15. Long holes 22 are located at intersections of the left and right wall edges 21, 24 of the baffle plate 20, such that the clipping pieces 15 can be latched into the long holes 22.

Figure 5:
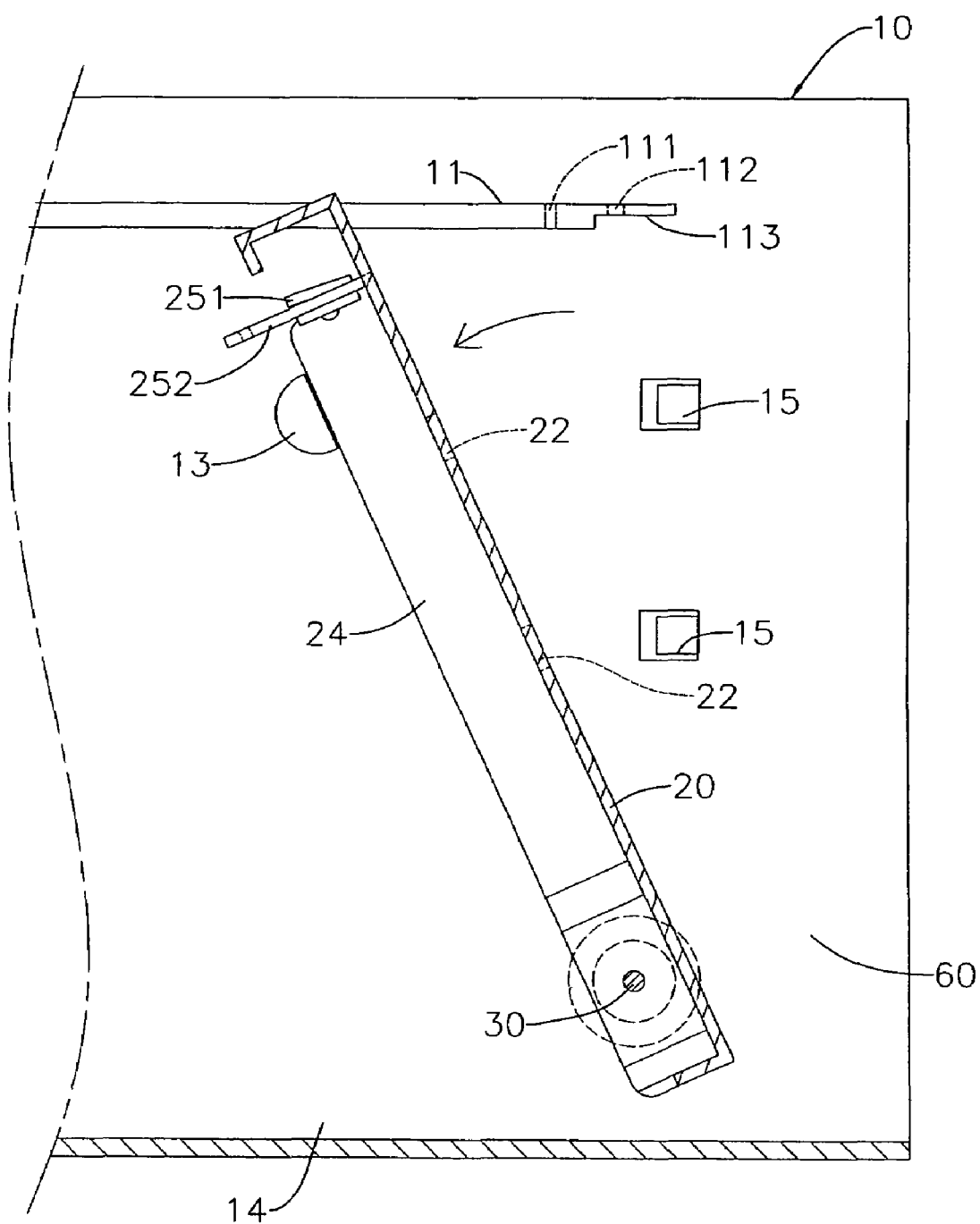
FIG. 5 shows a sectional view of another implementation of the present invention.

Referring to FIG. 5, the baffle plate 30 can be pivoted against the shaft 30 to be pressed against on the protruded members 13, such that the baffle plate 20 can be positioned and slanted in a pre-determined angle.

An implementation that a baffle plate 20 is vertically fixed inside a casing 10. Referring to FIG. 3, the baffle plate 20 is fixed on the left and right walls against the shaft 30, such that the baffle plate 20 is in a vertical position. The shaft 30 can be a bolt, which is screwed into the shaft holes 23 of the baffle plate 30 through the shaft holes 16 and is latched flexibly. The elastic spring leaves 251 are in the compression states and pressed against the upper walls of the transversal concave parts 113 below the upper surfaces 11. The screw hole 254 is opposite to the other screw hole 111, and the spring leaf 251 is opposite to the small through hole 112. An end of the spring leaf 251 is fixed on the baffle plate 20 to constitute an elastic cantilever, thereby increasing a pliability of the spring leaf 251 upon sustaining with a force. A plurality of clipping pieces 15 are latched into a plurality of long holes 22. When the baffle plate 20 is in a vertical position, the clipping pieces 15 are fixed on the left and right wall edges 21, 24 of the baffle plate 20, and are then screwed into the screw holes 111, 254 through the bolts 40, such that the baffle plate 20 can be fixed on the upper surfaces 11. By a fixing with the clipping pieces 15 and the bolts 40, the baffle plate 20 can be firmly positioned on the left and right walls 14.

Figure 4:
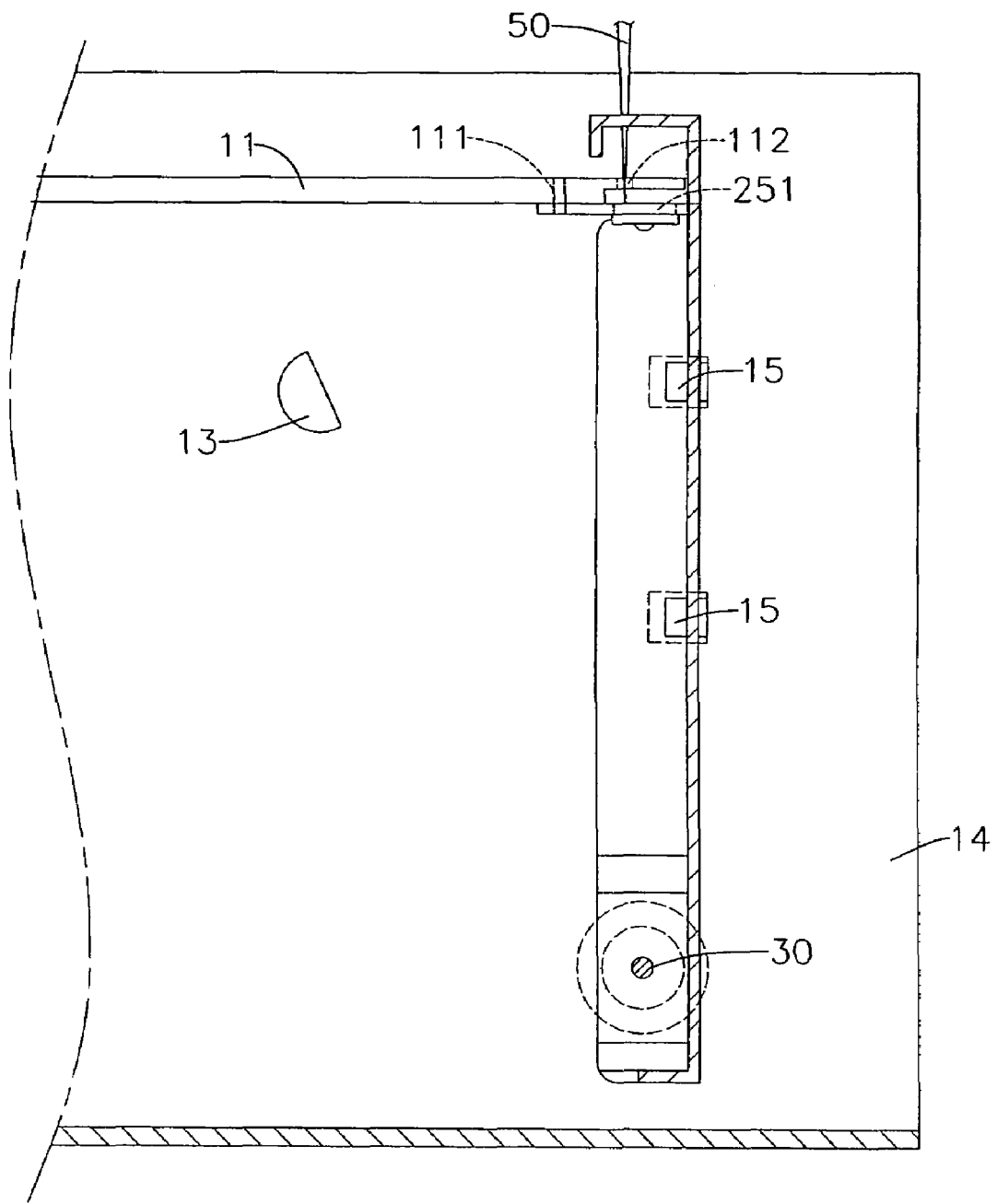
FIG. 4 shows a sectional view of an implementation of the present invention.

An implementation that a baffle plate 20 is rotated by an offset angle inside a casing 10. Referring to FIG. 4, an operator removes the bolts 40 out of the screw holes 111 and then holds a thin tool 50 to pass through the small through hole 112 and to exert a force from a top to a bottom, so as to compress the spring leaf 251 to be retracted with the thin tool 50, thereby eliminating a state that the spring leaf 251 is pressed against the upper wall of the transversal concave part 113. As shown in FIG. 5, upon lifting the baffle plate 20, the baffle plate 20 can be pivoted counterclockwise against the shaft 30. More particularly, as the plurality of long holes 22 are located at intersections of the left and right wall edges 21, 24 of the baffle plate 20, therefore when the baffle plate 20 is rotated, the clipping pieces 15 can be successfully escaped from the left and right wall edges 21, 24, such that the baffle plate 20 can be successfully rotated. When the baffle plate 20 is rotated to the protruded members 13, the baffle plate 20 can be positioned and slanted in a pre-determined angle by a stopping and positioning of the protruded members 13, thereby enlarging a space 60 at an exterior of the baffle plate 20 to facilitate an assembling and disassembling of other components.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A computer casing baffle plate device comprising a computer casing which includes two side walls at a left and a right opposite ends, wherein the two side walls are provided with protruded members, shaft holes are located below the left and right walls, screw holes are located at side ends of upper surfaces, which are in a transversal direction, of the left and right walls, with small through holes located in front of the screw holes, and transversal concave parts formed below front ends of the upper surfaces; shaft holes being located below left and right wall edges of a baffle plate, with spring leaves having protruded slopes and protruded plates extended outward in a transversal direction being fixed on two sides of upper plate surface of the baffle plate; the protruded plates being provided with screw holes; a shaft being flexibly connected to the shaft holes on the casing and the shaft holes on the baffle plate; bolts being screwed into the screw holes on the transversal upper surfaces and screw holes of the protruded plates; spring leaves being compressed, deformed, and against walls of the transversal parts, so thereby vertically fixing the baffle plate inside the casing.

2. The computer casing baffle plate device according to claim 1, wherein clipping pieces having elasticity which are protruded on the left and right side walls in front of the protruded members, thereby forming latch slots in interior sides of the clipping pieces, and long holes are located at intersections of the left and right wall edges of the baffle plate, such that the clipping pieces can be latched into the long holes.

3. The computer casing baffle plate device according to claim 1, wherein the baffle plate can be pivoted against the shaft, and be pressed against the protruded members, such that the baffle plate can be positioned and slanted in a pre-determined angle.

* * * * *